UNITED STATES PATENT OFFICE.

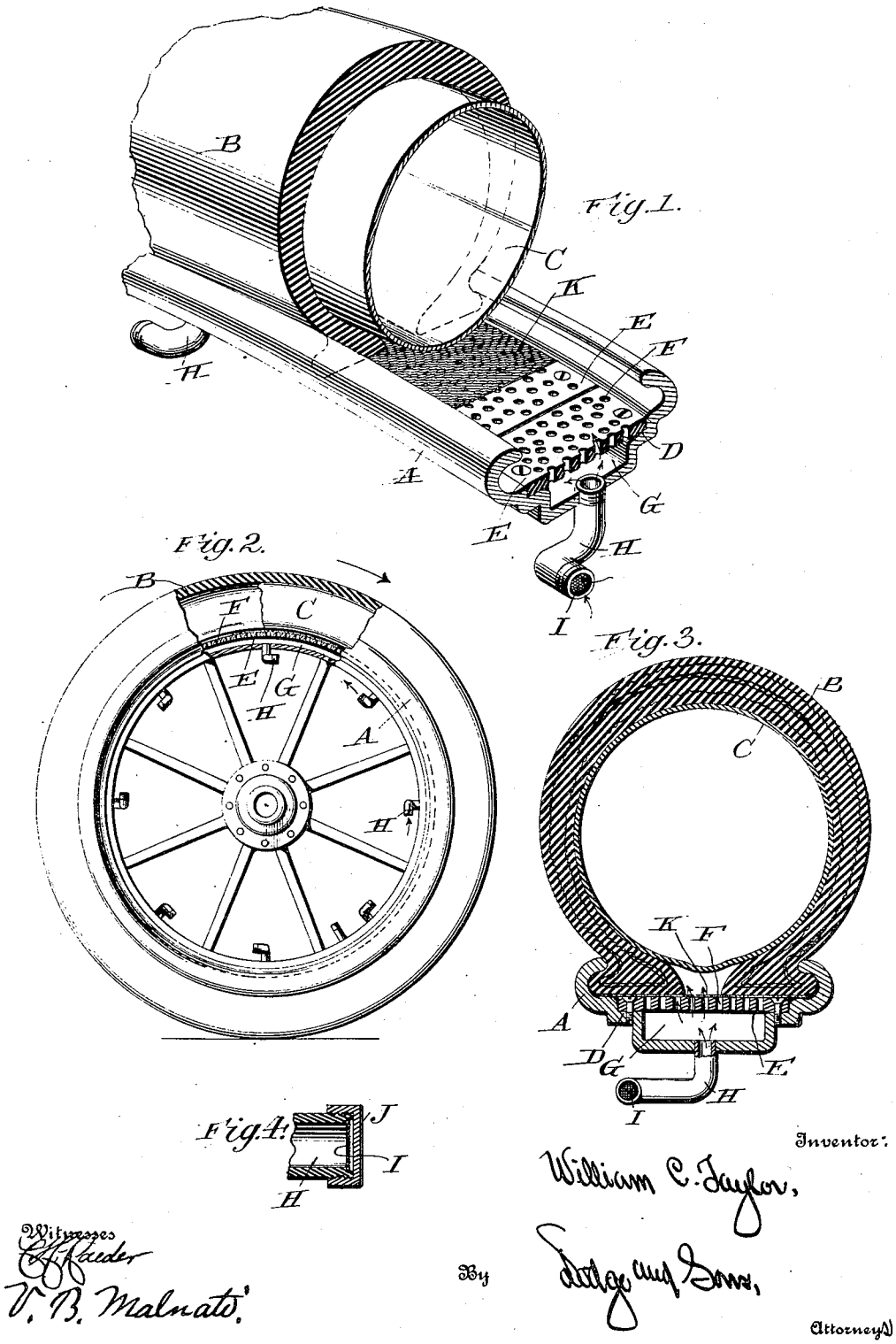

WILLIAM C. TAYLOR, OF PARIS, FRANCE, ASSIGNOR OF ONE-HALF TO CLARENCE G. TAYLOR, OF WASHINGTON, DISTRICT OF COLUMBIA.

VEHICLE-TIRE.

No. 872,860.  Specification of Letters Patent.  Patented Dec. 3, 1907.

Application filed February 20, 1907. Serial No. 358,431.

To all whom it may concern:

Be it known that I, WILLIAM C. TAYLOR, a citizen of the United States, residing at Paris, in the Department of the Seine, Republic of France, have invented certain new and useful Improvements in Vehicle-Tires, of which the following is a specification.

My present invention pertains to improvements in vehicle tires, and has reference more particularly to improved means for preventing the tire from becoming overheated.

The invention is illustrated in the accompanying drawings, wherein:

Figure 1 is a perspective view of a portion of a pneumatic tire and the rim of a wheel; Fig. 2 is a side elevation of a wheel, partly in section; Fig. 3 a transverse sectional view of the tire and rim; and Fig. 4 a detail view.

The object of the invention is to provide means for bringing air into contact with the tire at that portion which is adjacent to the rim, whereby the tire will be kept relatively cool and prevented from exploding or burning owing to the heat generated when the wheel is traveling at a high rate of speed or when the tire is being run flat in consequence of the puncture of the tube or otherwise.

As an incident of the construction which I employ, the outer casing will be prevented from blowing out should the inner tube for any reason explode as, for instance, if said tube be defective. In case of such explosion air would pass out through the perforations formed in the supporting plate hereinafter referred to in detail, and the tubes which are employed normally to force air into the chamber formed beneath said perforated plate.

As will be readily appreciated by those skilled in the art, serious difficulty obtains with pneumatic tires by reason of the fact that when they become overheated the rubber or other material of which they are composed deteriorates to such an extent that the outer casing or covering will not withstand the high internal pressure exerted by the air confined within the inner tube.

In its broad sense the invention may be said to consist of a foraminous or perforate support for the tire, with means for forcing air into the space beneath said support and thus through the openings therein into contact with the tire.

In the drawings I have illustrated a simple form of the invention, wherein A designates the rim of the wheel, shown in this instance as a clencher rim; B the outer shoe or casing, and C the inner tube. Mounted within the rim and resting upon shoulders D formed thereon is a plate E, said plate being secured to the rim by suitable screws, bolts or the like. The plate is preferably made in sections so that it may be readily removed when occasion requires. As will be seen upon reference to Figs. 1 and 3, the plate is provided with a series of openings F, which extend through said plate and practically across the entire width thereof.

By reason of the formation of the rim as shown in the drawings, a recess or chamber G is provided beneath the plate E and the inner wall of the rim. Opening into said chamber at intervals around the rim are tubes H, preferably formed or bent laterally, as best shown in Figs. 1 and 3, the mouths of some of the tubes opening in one direction while those of the other tubes open in the opposite direction. A screen I will preferably be placed in the mouth of each tube, to prevent the entrance of dust and other extraneous matter. If need be, the tubes may be closed by a cap, as J, Fig. 4, when the vehicle is passing through water, mud or the like. Ordinarily the caps will not be upon the tubes, so that as the wheel rotates in the direction of the arrow in Fig. 2, the air will be forced into those tubes H the mouths of which open in the direction of rotation of the wheel. As a consequence, the air will be forced out of the intermediate tubes, the mouths of which open in a direction reverse to the direction of rotation of the wheel. These tubes will also serve to suck out the air even though the other tubes do not tend to gather and force the air through the chamber G.

In order to protect the inner tube C from injury by coming into contact with the perforate plate E, a screen K of fine wire or the like may be introduced between the plate E and the tire, which screen while preventing the tire from blowing through the holes will nevertheless take up the heat from the tire and give it off to the air which is being constantly forced through the openings in the perforated plate.

As will be readily appreciated, should the inner tube burst, by reason of any defect therein, the air passing therefrom would not blow out through the casing but would pass through the openings in the supporting plate and out through the tubes.

Having thus described my invention, what I claim is:

1. In combination with a rim; a plate carried thereby, said plate being provided with numerous perforations throughout its length and breadth; a pneumatic tire mounted upon the rim over said perforate plate; and means for admitting air to the opposite side of the plate.

2. In combination with a rim; a perforate plate mounted thereon; a chamber formed between said plate and the rim; a tire mounted over said plate; and means for forcing air into the chamber independently of the compression and expansion of the tire.

3. In combination with a rim having a chamber extending around the same; a series of tubes opening into said chamber; a plate mounted over the chamber, said plate being provided with numerous perforations throughout its length and breadth, the perforations being in communication with the external atmosphere through the chamber and tubes; and a pneumatic tire carried by the rim and resting upon the plate.

4. In combination with a rim having a chamber extending around the same; a perforate plate carried by the rim and forming the upper wall of the chamber; a series of tubes opening into said chamber; a screen mounted upon the plate; and a tire carried by the rim and resting upon the screen.

5. In combination with a rim having a chamber formed around the same; a perforate plate carried by the rim and forming the upper wall of the chamber; tubes communicating with said chamber, the mouths of the tubes opening in opposite directions, whereby upon rotation of the wheel air will be forced into and out of the chamber; and a tire secured to the rim and bearing upon the plate.

6. In combination with a rim having a chamber extending around the same; a perforate plate carried by the rim and forming the upper wall of the chamber; means for introducing air into said chamber; a wire screen resting upon the plate; and a tire secured to the rim and resting upon the screen.

In testimony whereof I have signed my name to this specification in the presence of two subscribing witnesses.

WILLIAM C. TAYLOR.

Witnesses:
HORACE A. DODGE,
CLARENCE G. TAYLOR.